Patented Feb. 1, 1927.

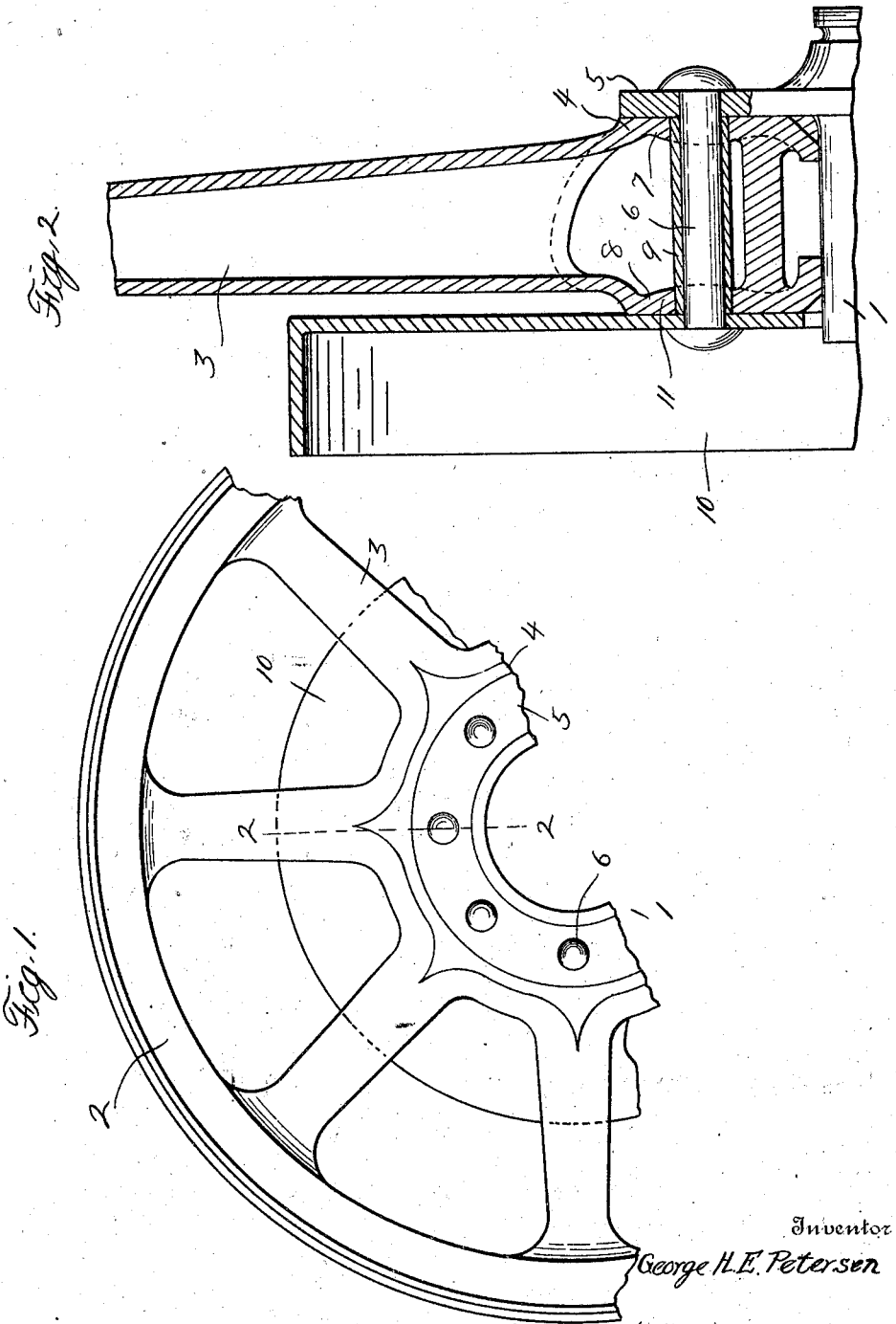

1,615,847

UNITED STATES PATENT OFFICE.

GEORGE H. E. PETERSEN, OF DETROIT, MICHIGAN, ASSIGNOR TO PAIGE-DETROIT MOTOR CAR COMPANY, OF DETROIT, MICHIGAN, A CORPORATION OF MICHIGAN.

CAST-WHEEL CONSTRUCTION.

Application filed April 27, 1925. Serial No. 26,218.

The invention relates to cast wheel constructions and refers more particularly to wheels formed of malleable iron and applicable to motor vehicles. One of the the objects of the invention is the provision of a cast wheel having a hub section which is secured to a hub flange by means extending therethrough and is provided with means adjacent to the securing means for relieving the hub section from the crushing stress produced by the securing means. Another object is the provision of a spacer of a length substantially equal to the width of the hollow hub section and surrounding the element for securing the hub section to the hub flange. Further objects of the invention reside in the novel features of construction and combinations and arrangements of parts as more fully hereinafter set forth:

In the drawings:—

Figure 1 is a side elevation of a cast wheel embodying my invention.

Figure 2 is a cross section on the line 2—2, of Figure 1.

The cast wheel, which is preferably formed of malleable iron, has the hub section 4, the felly section 2 and the spokes 3 integral with and connecting the hub and felly sections. The hub section and the spokes are hollow.

For securing the cast wheel to the wheel hub 1 I have provided means extending through the hub section 4 of the cast wheel and the annular flange 5 of the wheel hub, this flange being fixed upon the wheel hub. This securing means as shown comprises the rivet elements 6 extending through aligned holes in the front and rear walls 7 and 8, respectively, of the hub section and also through aligned holes in the hub flange 5. For relieving the hub section 4 from the crushing stress imposed by the rivet elements, I have provided the tubular spacers 9 surrounding the rivet elements 6 and having a length substantially equal to the external width of the hub section. These spacers also engage in the aligned openings in the front and rear walls of the hub section and preferably abut the hub flange. The arrangement is such that the spacers permit the hub section to be firmly clamped to the wheel hub flange and at the same time relieve the hub section from a stress which might crush its walls.

As shown, the brake drum 10 may also be secured to the wheel by the rivet elements 6, this brake drum being located at the rear side of the wheel and contacting with the rear face of the raised portion 11 upon the rear wall 8.

What I claim as my invention is:

1. The combination with a hub and a flange thereon, of a cast wheel having a hub section provided with spaced walls, means for securing said hub section to said flange, including a member extending through said hub section and means for relieving said hub section from crushing stress including a spacer adjacent to said securing member and having a length substantially equal to the width of said hub section.

2. The combination with a hub and a flange thereon, of a cast wheel having a hub section provided with spaced front and rear walls, means for securing said hub section to said flange including a member extending through said hub section and means for relieving said hub section from crushing stress including a tubular spacer surrounding said securing member and having a length substantially equal to the external width of said hub section.

3. The combination with a hub and a flange thereon, of a brake drum, a cast wheel having a hub section provided with spaced walls and located between said flange and the web of said brake drum, means for securing said hub section and brake drum to said flange, including a member extending through said hub section and connected to the web of said brake drum and said flange and means for relieving said hub section from crushing stress, including a tubular member insertable into said hub section and surrounding said securing member, said tubular member having a length substantially equal to the width of said hub section and abutting said hub flange and brake drum respectively.

In testimony whereof I affix my signature.

GEORGE H. E. PETERSEN.